United States Patent

[11] 3,618,637

| [72] | Inventor | Louis S. Santomieri<br>Benicia, Calif. |
|---|---|---|
| [21] | Appl. No. | 8,568 |
| [22] | Filed | Feb. 4, 1970 |
| [45] | Patented | Nov. 9, 1971 |
| [73] | Assignee | Deseret Pharmaceutical Company, Inc.<br>Sandy, Utah |

[54] ROTARY MIXING VALVE
1 Claim, 3 Drawing Figs.

[52] U.S. Cl. .................................................137/625.41,
137/625.11, 137/625.47
[51] Int. Cl. ............................................... F16k 19/00
[50] Field of Search .......................................... 137/1,
625.11, 625.47, 625.41; 251/297

[56] References Cited
UNITED STATES PATENTS

| 825,370 | 7/1906 | Zurbach | 137/625.11 X |
| 1,228,469 | 6/1917 | Mueller | 137/625.11 |
| 1,469,612 | 10/1923 | Bahr | 137/625.17 |
| 2,261,213 | 11/1941 | Bierman | 137/625.41 X |
| 3,057,350 | 10/1962 | Cowley | 137/625.41 X |
| 3,115,896 | 12/1963 | Roberts et al. | 251/297 X |
| 3,508,582 | 4/1970 | Aulisa | 137/625.11 |

*Primary Examiner*—William R. Cline
*Attorney*—Lynn G. Foster

ABSTRACT: Apparatus and method for conducting any selected one or combination of a plurality of available fluids to an infusion tube, the apparatus having a hollow housing with a plurality of radially spaced fluid input sites and a single core having an effluent passageway, the core being displaceable relative to the housing to bring the passageway serially into fluid communication with the inlet sites. A bypass may be formed between the core and the interior wall of the housing at at least one input site so that one fluid may be mixed with another at the input site prior to passage of the mixed fluids into the effluent passageway.

PATENTED NOV 9 1971

3,618,637

INVENTOR.
LOUIS S. SANTOMIERI
BY
*Lyndon Foster*
ATTORNEY

ROTARY MIXING VALVE

BACKGROUND

1. Field of the Invention

The invention relates to valves and more particularly to novel method and apparatus for conducting fluids of a selected type into an infusion tube in a selected sequence.

2. The Prior Art

It is a well-known medical technique to infuse a plurality of fluids into the cardiovascular system of a patient. Historically, various techniques have been used to infuse a plurality of fluids, the most common being the provision of a coupling intermediate the length of the fusion tube which allows one source of intravenous fluid to be detached from the infusion tube and another source to be thereafter attached to the infusion tube. This procedure has been found to be seriously disadvantageous because of the high risk that air will be introduced into the infusion tube so that when the air enters the cardiovascular system of the patient, a dangerous embolism can be formed. Also, it has been found that in detaching one fluid source from the infusion tube and attaching another fluid source frequently causes fluid to be spilled on the floor, bedding, clothing and the like. Many fluids, such as whole blood cause stains and other marks which are difficult to remove.

In an effort to make a plurality of fluids available to a patient and to avoid the procedure above described, couplings have been developed which have a plurality of input sites accommodating simultaneous infusion of a plurality of fluids into a single infusion tube. Although the mentioned couplings accommodate simultaneous infusion of a plurality of fluids, continuous mixing of a plurality of fluids is not always desirable and, until this present invention, a single valve for controlling which fluid and in what sequence the fluid will be conducted into the infusion tube has not been known.

BRIEF SUMMARY AND OBJECTS OF THE INVENTION

The present invention, including method and apparatus, provides a single station control for connecting any one of a plurality of fluid sources into an infusion tube. Manipulation of the single station control accommodates essentially immediate change of fluid communication from one source to another source without the introduction of air into the infusion tube.

It is a primary object of the present invention to provide a novel fluid valve.

It is another primary object of the present invention to provide method and apparatus for infusing a plurality of fluids into a patient in a predetermined sequence with minimum risk to the patent.

These and other objects and features of the present invention will become more fully apparent from the following description and appended claims taken in conjunction with the accompanying drawings.

DETAILED DESCRIPTION OF THE PREFERRED EMBODIMENT

The Structure

Figure 1:
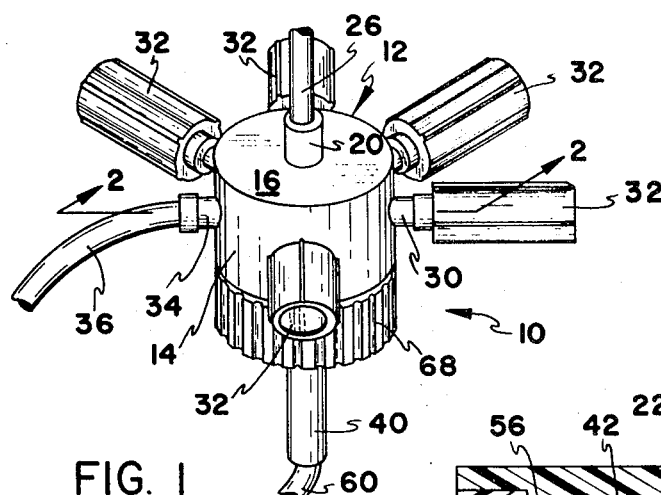
FIG. 1 is a perspective view of one presently preferred valve embodiment of the invention, the input sites in the valve being coupled with plugs or a fluid delivery tube.

Reference is now made to the figures wherein like parts are designated with like numerals throughout. With reference particularly to FIG. 1, the turret valve generally designated 10 is, in the illustrated embodiment, generally cylindrical in configuration and comprises a housing 12 having a curved peripheral wall 14, an upper planar end 16 and a lower planer end 18 (see FIG. 2). The housing 12 may be formed of any suitable material, although it is presently preferred that a transparent plastic be used.

Figure 2:
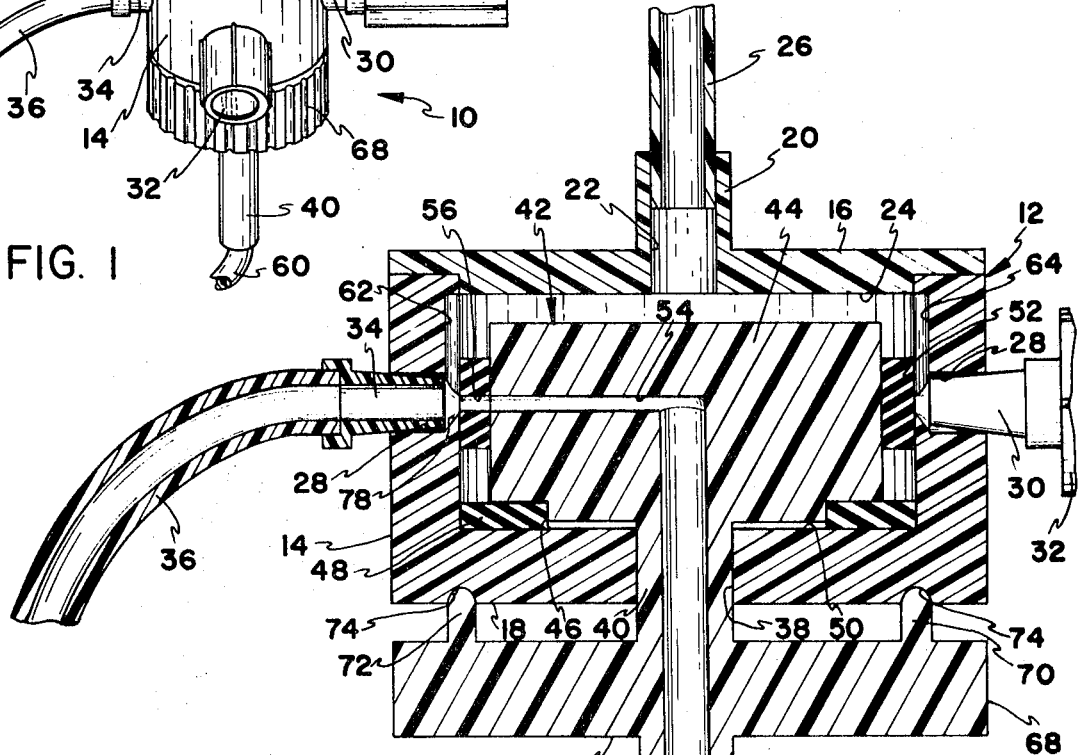
FIG. 2 is a cross section taken along lines 2—2 of FIG. 1.

An annular boss 20 is integral with the upper planar end 16 and projects outwardly generally normal to the plane of end 16. The boss 20 has an annular through-bore which opens into the interior hollow 24 of the housing 12. A tube 26 is telescopically press fit into the bore 22, and it is presently preferred that the tube 26 be bonded in the bore 22 as shown in FIG. 2. Tube 26 is preferably connected to a primary fluid source, such as blood or other infusion fluid, which is in open communication with the interior 24 of the housing 12.

With reference to FIG. 2, the curved wall 14 of the housing 12 is provided with a plurality of radically spaced apertures 28 which open into the interior 24 of the housing 12. As illustrated in FIGS. 1 and 2, the apertures 28 may be filled with the tapered male end 30 of a conventional plug 32. It should be appreciated that any or all of the plugs may be replaced with the male coupling 34 of a conventional fluid delivery tube such as tube 36 as will be subsequently more fully described.

The bottom planar end 18 has an annular aperture 38 through which the shank 40 of the valve core generally designated 42 is disposed. The valve core 42 has a cylindrical head 44 which is substantially smaller than the inside diametral dimension of the hollow 24 of housing 12. Also, the vertical dimension of the valve head 42 is less than the vertical dimension of the hollow 24. Thus, the valve core 42 is spaced from the top end 16 and the peripheral walls 14 of the housing 12 so that both rotational and vertical displacement of the core 42 within the housing 12 is possible.

The head 44 is provided with an annular recess 46 at the lower peripheral edge of the head, the recess being normally disposed over a resilient rubber bearing 48. Bearing 48 is annular in configuration and is disposed within the hollow 24 of the housing 12 adjacent the lower planar end 18.

The bearing 48 suspends the head 44 away from the lower planar end 18 so that a space 50 exists between the head 44 and the end 18. Also the bearing is resiliently compressible so that the head may be displaced against the compression of the bearing 48 upon the end 18, although bearing 48 normally urges the head into the position illustrated in FIG. 2 for a purpose hereinafter more fully described.

An annular rubber seal 52 is mounted upon the curved peripheral edge of the head 44 so as to be aligned with apertures 28 in the housing 12. If desired, the seal 52 may be bonded to the head 44 so that relative movement between the seal and the head is prevented.

The head 44 is provided with a radially directed bore 54 which is disposed in the same plane as the apertures 28. The rubber seal 52 has an aperture 56 which is coaxial with bore 54 so that when the bore 54 is aligned with an aperture 28, such as illustrated in FIG. 2, open fluid communication exists between the fluid delivery tube 36 and the bore 54. Bore 54 is in open communication with a effluent passageway 58 which is coaxial with the shank 40 of the valve core 42. An intravenous infusion tube 60 is press fit, bonded or otherwise suitable secured in fluid communication with the effluent passageway 58 in the shank 40 so that fluid from the delivery tube 36 will be communicated directly through the passageway 58 into the infusion tube 60 when the bore 54 is aligned with the proper aperture 28. If desired, bore 54 could extend completely through the head 44 and open at the diametrally opposite surface to accommodate simultaneous communication of additional fluids into the passageway 58.

It is presently preferred that a bypass channel 62 be formed in the interior curved wall of the housing 12, the bypass 62 preferably intersecting at least one but not all of the apertures 28, as at the conically reduced portion 78 as shown in FIG. 2. Thus, in the FIg. 2 position, fluid communication exists between the tube 26 and the core 54 through the bypass 62 even though male coupling 34 is situated within the aperture 28. Thus, fluid in tube 26 and in tube 36 can be comingled at portion 78 and simultaneously introduced into the bore 54. The bypass 64 which is diametrally opposite from the bypass 62 is, in the FIG. 2 position, prevented from passing fluid by the annular seal 52. When desired, the valve core 42 could be rotated relative to the housing 12 so that the bore 54 is in alignment with the bypass 64. In that position, because of the plug 32, only fluid existing in tube 26 would be communicated to the effluent passageway 58. The seal 52 would prevent fluid flow through both the bypass 62 and through the delivery tube 36.

The shank 40 has a diametrally enlarged collar 66, the collar 66 preferably having a diametral dimension which is substantially the same as the diametral dimension of the cylindrical housing 12. Collar 66 has serations on the peripheral edge 68 and the collar is integral with the shank 40 so that the collar may be rotated with the fingers to simultaneously rotate the valve core 40.

Figure 3:
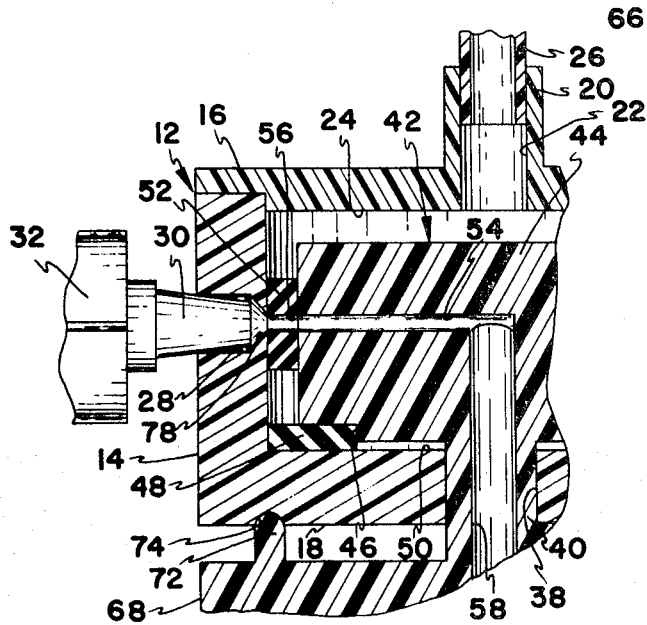
FIG. 3 is a fragmentary cross section similar to FIG. 2 with the valve core rotated to another input site.

Preferably collar 66 is provided with upwardly projecting detents 70 and 72 which are adapted to be received by any of a plurality of radially spaced recesses 74, the recesses being situated so as to receive detents 70 and 72 only when the bore 54 is in alignment with one of the apertures 28 as shown in FIGS. 2 and 3.

When the collar 66 is rotated relative to the housing 12 so that the detents 70 and 72 are displaced out of corresponding recesses 74, the shank and valve core will be displaced axially in a direction downward as viewed in FIG. 2 thereby compressing the annular bearing 48 and reducing the size of space 50. Thus, the annular bearings 48 continuously urges the valve core 42 in a direction upwards as viewed in FIG. 2 so that when the detents 70 and 72 are brought into alignment with corresponding recesses 74, the detents will be urged into the recesses. Thus, an operator of the valve can immediately determine when the bore 54 is in alignment with one of the apertures 28 because slight resistance to continued rotation of the collar is developed. Moreover, the valve core 42 and the bore 54 will remain in the alignment position until the valve core is manually forced out of position by rotating the collar 66 to displace the valve core against the bias of bearing 48.

The Operation

In the operation of the illustrated embodiment of the invention, fluid is normally conducted through the tube 26 to the interior of housing 12. Also, any number of the plugs 32 may be removed and replaced with the male coupling of a fluid delivery tube, one such fluid delivery tube being illustrated in FIGS. 1 and 2.

The valve core 42 is positioned within the hollow 24 of the housing 12 by rotating the collar 68. When the collar reaches position illustrated in FIG. 2, detents 70 and 72 will be urged into corresponding recesses 74 by the memory of the bearing 48 and, in this position, bore 54 will be in alignment with aperture 28. In the FIG. 2 position, bore 54 is in direct communication with the fluid delivery tube 36. The bore 54 is also in direct fluid communication with fluid entering the housing 12 through the tube 26. It should be observed that the fluid entering from tube 26 passes through the bypass 62 to the conically reduced portion 78 of the bore 28 where the fluids from the delivery tube 36 and the tube 26 are comingled prior to entering into the bore 54. The comingled fluids are then passed through the effluent passageway 58 in the bank 40 and, thereafter, into infusion tube 60.

If desired, the valve core 42 may be rotated around the axis of the shank 40 so that the bore 54 is in alignment with the diametrally opposite aperture 28. In this position, since no fluid is conducted through the plug 32, only fluid from the tube 26 will be conducted into the bore 54. The fluid in delivery tube 36 may be prevented from entering into the hollow 24 in any substantial amount by, for example, increasing the fluid pressure in tube 26 over the fluid pressure in the delivery tube 36.

Also, when desired, the valve core 42 may be rotated to any one of the other angular positions in alignment with a aperture 28, one such position being illustrated in FIG. 3. As shown in FIG. 3, if the aperture 28 is filled with plug 32, no fluid will be conducted into the bore 54. It should be observed in FIG 3, that the aperture 28 is not provided with a bypass such as bypass 62 shown in FIG. 2. Therefore, in the FIG. 3 position, no fluid whatever will flow into the effluent passageway 58. However, when plug 32 is replaced with the male coupling of a fluid delivery tube, such as coupling 34 shown in FIG. 2, only fluid from the fluid delivery tube will enter into the bore 54.

The invention may be embodied in other specific forms without departing from the spirit or essential characteristics thereof. The present embodiment is, therefore, to be considered in all respects as illustrative and not restrictive, the scope of the invention being indicated by the appended claims rather then by the foregoing description, and all changes which come within the meaning and range of equivalency of the claims are therefore to be embraced therein.

What is claimed and desired to be secured by U.S. Letters Patent is:

1. A value for selectively communicating any one of a plurality of available fluids into an infusion tube, the valve comprising:
   a hollow cylindrical housing having planar end surfaces and having a plurality of radially disposed ports forming fluid input sites in the curved surfaces of said housing;
   a central cylindrical core disposed within the hollow housing having a passageway adapted to be aligned with any selected one of the fluid input sites and having a fluid conduit in communication with the passageway which projects exterior of the housing at one planar end of the housing;
   a source of primary fluid communicating the fluid through the other planar end of the housing between the interior wall of the housing and the core; and
   at least one groove in the interior wall of the housing intersecting a fluid input site so that primary fluid will flow through the core when the passageway is aligned with the fluid input site and so that introduction of at least one secondary fluid through the input site into the passageway simultaneously with the primary fluid is possible.

* * * * *